United States Patent [19]  [11] Patent Number: 4,634,552
Canestri  [45] Date of Patent: Jan. 6, 1987

[54] POLYMERIC DIAMINO TRIAZINE DISPERSING AGENT AND PREPARATION THEREOF

[75] Inventor: Giuseppe Canestri, Rastiguano, Italy

[73] Assignee: Bergvik Kemi AB, Sweden

[21] Appl. No.: 729,868

[22] Filed: May 2, 1985

[51] Int. Cl.⁴ .................. B01F 17/32; B01F 17/34
[52] U.S. Cl. ............................... 252/356; 106/22; 106/23; 106/308 N; 252/309; 252/357; 252/363.5; 544/208
[58] Field of Search ............ 252/309, 356, 357, 363.5; 106/308 N; 544/208

[56] References Cited

U.S. PATENT DOCUMENTS

| | | | |
|---|---|---|---|
| 2,508,652 | 5/1950 | Ross et al. | 252/357 X |
| 2,892,807 | 6/1959 | Sellers et al. | 106/308 N X |
| 2,987,514 | 6/1961 | Hughes et al. | 252/357 X |
| 3,047,532 | 7/1962 | D'Alelio | 544/208 X |
| 3,165,514 | 1/1965 | D'Alelio | 544/208 X |
| 3,300,326 | 1/1967 | Ferrigno | 106/308 N X |
| 3,310,416 | 3/1967 | Schibler | 252/357 X |

FOREIGN PATENT DOCUMENTS 7304337 10/1973 Netherlands .................. 252/357

Primary Examiner—Richard D. Lovering
Attorney, Agent, or Firm—James S. Waldron

[57] ABSTRACT

A polymeric diamino triazine dispersing agent comprising a compound the essential parts of which are
a diamino triazine group and
a polymer chain having a molecular weight of at least 1000, which compound has been obtained by reacting a diamino triazine and a polymer chain having a molecular weight of at least 1000 with an oxiran containing compound. The dispersing agent comprises compounds of the formulas

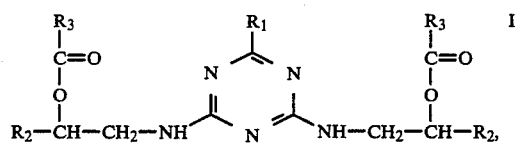

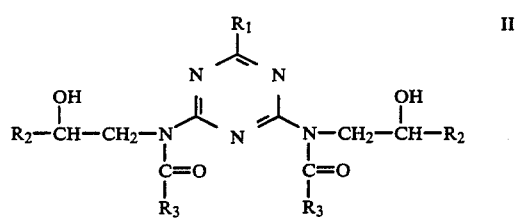

and

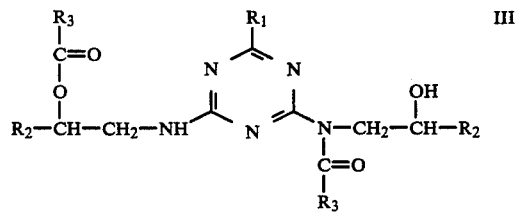

wherein
$R_1$ is aryl or alkyl having 1–8 carbon atoms,
$R_2$ is a hydrocarbon radical optionally comprising one or more ether groups and having a molecular weight of less than 200, and
$R_3$ is a polymer chain residue having a molecular weight of at least 1000.

The dispersing agent can be used for dispersing solid particles, such as pigment particles, in a non polar solvent.

11 Claims, No Drawings

POLYMERIC DIAMINO TRIAZINE DISPERSING AGENT AND PREPARATION THEREOF

The present invention relates to a dispersing agent comprising a polymeric diamino triazine compound, to processes for preparing said dispersing agent and to the use of said dispersing agent for dispersing solid particles in a non polar solvent. The dispersing agent of the invention is particularly suitable for dispersing pigment particles in an organic solvent.

A dispersion of a pigment obtained according to the invention can be used in the manufacture of printing inks and paints as well as for any purpose for which dispersions of such particles are conventionally used.

For a dispersing agent to be effective in dispersing solid particles in a liquid system it must be able to wet the particles, reduce the agglomerate size and to stabilize the dispersion obtained. A dispersant molecule for dispersing solid particles in an organic liquid and complying with said requirements, generally is made up of two main parts. One part, the block, is to be intimately adsorbed onto the surface of the particle and the other part, the arm or arms, is a polymer chain having affinity for the organic liquid.

Polymeric triamino triazine compounds have been described in DE OS No. 17 19 404. These compounds are water soluble ethers of formaldehyde condensates of melamine wherein at least one methylolgroup has been etherified with a polyethylene glycol of a molecular weight of 600–20,000, which can be used as a dispersing agent for water insoluble substances, e.g. pigments, in water.

For dispersing solids, particularly dyestuffs and pigments, in organic liquids a dispersing agent comprising the reaction product of a poly(lower alkylene)imine with a polyester having a free carboxylic group, in which there are at least two polyester chains attached to each poly(lower alkylene) imine chain, is known from GB No. 2 001 083. Said dispersing agents are, however, not quite satisfactory in all aspects. As being strongly polar and surface active they are not fit for use in lithographic printing inks, which during the printing operation are brought into intimate contact with water.

To overcome this deficiency a polymeric dispersing agent has been suggested in part by the present inventor, as described in WO No. 81/02395, consisting of an oligo or polyamide chain being connected with at least one polymeric chain having a molecular weight of at least 1000. The described dispersing agent will, however, not give high solids dispersions of organic pigment particles, but is only capable of dispersing a medium concentration of that type of pigments.

The object of the invention is to provide a dispersing agent with high dispersing capacity for dispersing solid particles in a non polar solvent, and which is not affected by water but can be used for dispersing pigments for lithographic printing inks.

This object is attained by a dispersing agent comprising a compound, the essential parts of which are
a diamino triazine group and
a polymer chain having a molecular weight of at least 1000, which compound has been obtained by reacting a diamino triazine and a polymer chain having a molecular weight of at least 1000 with an oxiran containing compound. The dispersing agent of the invention shows affinity to particles of "acidic" character as defined by Palle Sørensen in "Application of the Acid/Base concept", Journal of Paint Technology, Vol. 47, No. 602, March 1975, pages 31–38, and is therefore capable of dispersing such particles, e.g. certain pigments and dyes, in organic liquids. In the dispersant molecules of the invention the diamino triazine constitutes the block as defined above, which owing to the amino groups and/or hydroxy groups deriving from the oxiran containing compound is of a basic character, and shows sufficient affinity to polar groups of acidic character on the surface of the solid particles to be able to promote dispersion thereof in an organic liquid. The polymer chain constitutes the arm or arms, which also sterically prevents movements of the dispersant molecule when the block has been adsorbed to the solid particle. This also means that flocculation is prevented. The block and the arms are linked together partly by amide bonds and partly by a chemically non reactive linkage, deriving from the oxiran group, which cannot be hydrolyzed and is not affected by variations in temperature. This non reactive linkage of the two main parts of the dispersing molecule probably accounts for the dispersion obtained not being sensitive to water and consequently being well suited for making lithographic printing inks.

In more detail a dispersing agent of the invention comprises compounds of the formulas

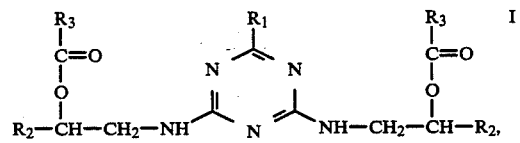

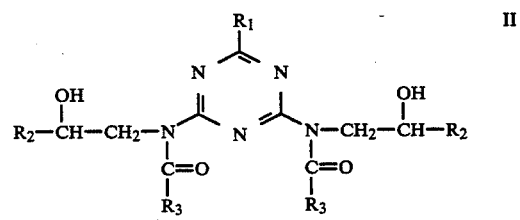

and

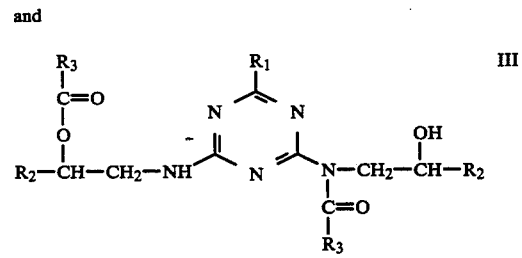

wherein
$R_1$ is aryl or alkyl having 1–8 carbon atoms,
$R_2$ is a hydrocarbon radical optionally comprising one or more ether groups and having a molecular weight of less than 200, and
$R_3$ is a polymer chain residue having a molecular weight of at least 1000,
which compounds are obtainable by reacting
a diamino triazine of the formula

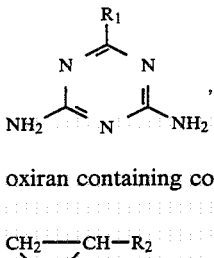   VI an oxiran containing compound of the formula

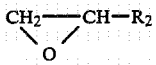   VII and
a polymer chain of the formula $R_3$—COOH   VIII in which formulas $R_1$, $R_2$ and $R_3$ are as defined above, in stoichiometrically equivalent amounts.

The diamino triazine is a 2,4-diamino-1,3,5-triazine which is substituted in 6-position with an aryl or alkyl having 1–8 carbon atoms, which group must not be reactive with the oxiran containing compound or with the polymer chain. As examples of said hydrocarbon radical may be mentioned phenyl, methyl, ethyl and propyl. The preferred group is phenyl.

The polymer chain to be connected with the triazine should have a molecular weight of at least 1000, preferably between 1200 and 2600 and not exceeding 3000. It is also of importance that the polymer chain is not crosslinked, but rather a linear, optionally branched molecule. The preferred polymer chain is a branched polyester chain, which has been obtained by polymerization of a saturated or unsaturated monohydroxy monocarboxylic acid having 8–20 carbon atoms between the oxygen atoms, especially 9–12 carbon atoms. A copolymer of a hydroxy carboxylic acid and the corresponding carboxylic acid not containing an hydroxy group is also preferred, as well as a copolymer of different hydroxy carboxylic acids. As specific examples of monohydroxy monocarboxylic acids can be mentioned 12-hydroxystearic acid and especially the commercially available hydrogenated castor oil fatty acid, and ricinoleic acid. Other suitable types of polymer chains are carboxy terminated polymers of butadiene. As a specific example of the last mentioned polymer can be mentioned "Hycar CTB 2000×156" (from B.F. Goodrich Chemical Company, USA), corresponding to the formula

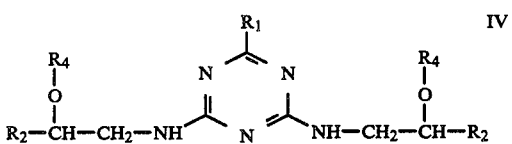

wherein m is a number of about 80.

In addition to being carboxy terminated the polymer chain may also be hydroxy terminated, in which case the dispersing agent will comprise compounds of the formulas

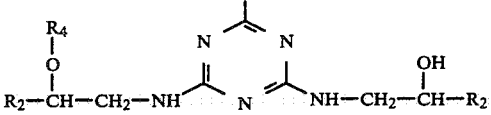   IV and

-continued

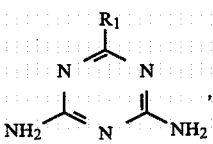   V wherein
$R_1$ is aryl or alkyl having 1–8 carbon atoms,
$R_2$ is a hydrocarbon radical optionally comprising one or more ether groups and having a molecular weight of less than 200, and
$R_4$ is a polymer chain residue having a molecular weight of at least 1000,
which compounds are obtainable by reacting
a diamino triazine of the formula

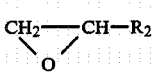   VI an oxiran containing compound of the formula

   VII and
a polymer chain of the formula $R_4$—OH   IX in which formulas $R_1$, $R_2$ and $R_4$ are as defined above, in stoichiometrically equivalent amounts.

A preferred hydroxy terminated polymer chain is a polymer which has been obtained by reacting a diol or a polyalkylene glycol with a polyester.

The oxiran containing compound corresponds to the formula

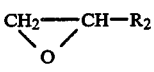   VII wherein the radical

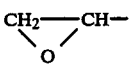

is oxiran.

The oxiran compound should have a molecular weight not exceeding 200, in order not to interfere with the solubility parameters of the product. $R_2$ must in addition be a group which is not reactive with the functional groups taking part in the reaction between the triazine and the polymer. $R_2$ can more specifically be defined as alkyl having 1–4 carbon atoms or R—O—$CH_2$—, wherein R is a hydrocarbon radical having 1–8 carbon atoms. As examples of preferred oxiran containing compounds can be mentioned allyl glycidyl ether, n-butyl glycidyl ether, 2-ethyl hexyl glycidyl ether, phenyl glycidyl ether, 1,2-epoxypropane and 1,2-epoxybutane.

The dispersing agent of the invention can be prepared in two main routes, each comprising two steps by processes. According to a first process the diamino triazine of the formula VI is first reacted with the oxiran containing compound of the formula VII to an intermediate product comprising compounds of the formulas

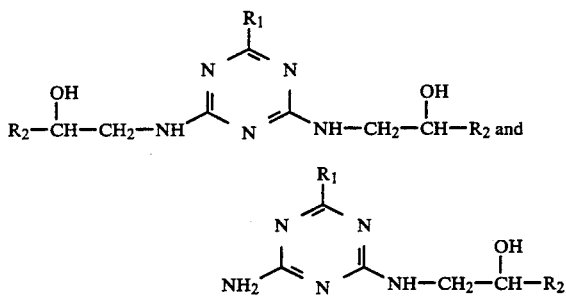

wherein $R_1$ and $R_2$ are as defined above, and the intermediate product is then reacted with the polymer chain of the formula VIII or IX, and the water being formed during the reaction is removed.

According to a second process the dispersing agent is prepared by first reacting the diamino triazine of the formula VI with the polymer chain of the formula VIII or IX to an intermediate product being a salt, and then the intermediate product is reacted with the oxiran containing compound of the formula VII, and the water being formed during the reaction is removed.

The reactions must be performed under inert atmosphere, preferably under nitrogen, and are initiated by heating the components to a temperature of 70° to 140° C. depending on the substances used. Water should be removed from the reaction mixture during the process in a conventional way, for instance by azeotropic destillation, by means of a vacuum or by means of a water reactive compound.

The invention also relates to a use of said dispersing agents for dispersing solid particles in a non polar solvent, for instance an organic liquid. The particles can be dispersed by well known methods for the preparation of dispersions.

Thus, the solid particles, e.g. pigment particles, the organic liquid and the dispersing agent according to the invention may be mixed in any sequence and the mixture may then be subjected to a mechanical treatment to break down agglomerates, if any, of solid particles, e.g. by ball-milling or roller-milling. The solid substances may also be milled alone with the dispersant or in admixture with the organic liquid and the other component(s) may be added, whereafter the dispersion is formed by stirring of the mixture.

The amount of dispersing agent in dispersions according to the invention is preferably from 1 to 20% by weight and more preferably from 5 to 15% by weight based on the weight of the solid particles. The dispersion preferably contains from 40 to 60% by weight of solid organic particles, and from 50 to 80% by weight of solid inorganic particles, based on the total weight of the dispersion. The organic liquids used for the preparation of said dispersions may be inert organic liquids in which the dispersing agent is at least partially soluble at room temperature and which are stable under the conditions at which the dispersions are to be used. If desired, mixtures of organic liquids may be used. Preferred organic liquids are hydrocarbons and halogenated hydrocarbons, such as toluene, xylene, white spirit, chlorobenzene, carbontetrachloride and perchloroethylene. Also other organic liquids can be used, for example esters, such as butyl acetate, alcohols, such as n-butanol, and vegetable oils. It is particularly preferred to use petroleum fractions. In general the selection of the organic liquids or mixture thereof used for the preparation of the dispersions will depend on the uses of the product to which the dispersions are to be put.

As mentioned above the solid particles preferably are pigment particles. In case of inorganic pigments, these are preferably such which contain a metal atom, and as examples of such pigments there may be mentioned titanium dioxide, prussian blue, cadmium sulphide, iron oxides, vermillon, ultramarine and chrome pigments including chromates of lead, zinc, barium and calcium and mixtures and modifications thereof. Such pigments are commercially available as greenish-yellow to red pigments under the names primrose, lemon, middle, orange, scarlet and red chromes.

The organic pigments are preferably water-insoluble metal salts or complexes, particularly calcium or barium salts or complexes of soluble or sparingly soluble organic dyes, especially azodyes and phthalocyanines.

Other examples of suitable pigments are for example described in the third edition of Colour Index (C.I. 1975, published by the American Association of Textile Chemists and Colourists and the Society of Dyers and Colourists.)

The dispersing agent of the invention may well be used in the flushing process for transferring a pigment particle from an aqueous to an oily phase.

The dispersions obtained according to the invention are fluid or semi-fluid compositions containing the solid in finely divided and usually deflocculated form and they can be used for any purpose for which the dispersions of such solids are conventionally used. Dispersions of pigments are of particular use in the manufacture of printing inks by admixing the dispersions with other components conventionally used in the manufacture of such inks. The dispersions are also of value in the manufacture of paints in which they may be admixed with e.g. conventional alkyd and/or other resins.

The dispersing agents of the invention can also be used for the manufacturing of easy dispersable pigments.

The dispersing agents are then distributed mechanically and efficiently on the surface of the pigments to form a protective layer on the surface, that can prevent reagglomeration of the pigment particles in media, in which the pigment should be dispersed, containing non-polar solvents or a very small amount of polar solvents.

The invention will be described in further details by the following examples, wherein given percentages are by weight.

EXAMPLES ON PREPARING THE DISPERSING AGENT

Example 1

64,000 g of commercial 12-hydroxystearic acid, having a COOH eq.w. of 326.2 and an OH eq.w. of 374, are reacted while stiring at 220° C. under nitrogen atmosphere, in a reactor for polymer production until 171.12 moles of water has been removed azeotropically with a mixture of 10/90 1,2-dichloropropane-toluene, and until the acid number of the reaction product is 23.1 mg KOH/g, corresponding to a COOH eq.w. of the product of 2427. The mixture of dichloropropane-toluene is removed in vacuum at 180° C. The product filtrated at 40° C. is a brownish low viscous liquid, being soluble in aromates and aromate-containing liquids.

Example 2

64,000 g of commercial ricinoleic acid having a COOH eq.w. of 315.17 and an OH eq.w. of 369.1 are reacted under the conditions mentioned in Example 1, until 173.4 moles of water has been removed azeotropically and until the acid number is 27.4 mg KOH/g, corresponding to a COOH eq.w. of the product of 2047. After removing of the azeotrope in vacuum at 180° C., the product, filtrated at 40° C., is a brownish low viscous liquid, soluble in aromates and aromate-containing liquids.

Example 3

A mixture of 200 g toluene dichloropropane 90/10, 187.2 g benzoguanamine and 228 g allyl glycidyl ether is heated while stirring in a 10 liters flask under nitrogen atmosphere to 140° C. until the reaction between —NH$_2$ and

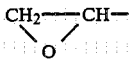

is completed. 4854 g of the polymer of Example 1 are added and then is heated at 170° C. until 36 g H$_2$O have been removed azeotropically, the reaction being catalyzed with p-toluene sulphonic acid. The toluene dichloropropane mixture is removed in vacuum at 170° C. The product thus obtained is a brownish low viscous liquid having an acid number of 0.3 mg KOH/g and being soluble in aromates and aromate-containing liquids.

Example 4

The same procedure and the same quantities in grams of benzoguanamine and the polymer of Example 1 are used as in Example 3, while allyl glycidyl ether is substituted with 260 g of n-butyl glycidyl ether.

Example 5

The same procedure and the same quantities in grams of benzoguanamine and the polymer of Example 1 are used, as in Example 3, while allyl glydicyl ether is substituted with 372 g of 2-ethylhexyl glycidyl ether.

Example 6

The same procedure and the same quantities in grams of benzoguanamine and the polymer of Example 1 are used, as in Example 3, while allyl glycidyl ether is substituted with 302 g of phenyl glycidyl ether.

Example 7

A mixture of 200 g toluene dichloropropane 90/10, 187.2 g of benzoguanamine and 116.2 g of 1,2-epoxy propane is heated while stirring in a 10 liters glass flask at 30° C., until the reaction between —NH$_2$ and

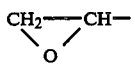

is completed. 4854 g of polymer of Example 1 are added and then is heated at 170° C. until 36 g H$_2$O have been removed azeotropically, the reaction being catalyzed with p-toluene sulphonic acid. The toluene dichloropropane mixture 90/10 is removed in vacuum at 170° C. The product thus obtained is a brownish low viscous liquid having an acid number of 0 mg KOH/g.

Example 8

The same procedure and the same quantities in grams of benzoguanamine and polymer of Example 1 are used as in Example 7, while the 1,2-epoxypropane is substituted with 144.2 g of 1,2-epoxybutane.

The product thus obtained, after removing the mixture of toluene dichloropropane, is a low viscous liquid having an acid number of 0 mg KOH/g.

Example 9

A mixture of 200 g toluene-dichloropropane 90/10, 187.2 g of benzoguanamine and 144.2 g of 1,2-epoxybutane is heated while stirring in a 10 liters flask from 30° to 50° C. until the reaction between —NH$_2$ and

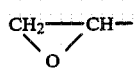

is completed.

4094 g of polymer from Example 2 are added and then is heated at 170° C. until 36 g H$_2$O have been removed azeotropically, the reaction being catalyzed with p-toluene sulphonic acid. The toluene dichloropropane mixture is removed in vacuum at 170° C. The product thus obtained is a brownish low viscous liquid having an acid number of 0 mg KOH/g and being soluble in aromates and aromate-containing liquids.

Example 10, 11, 12, 13, 14

The above mentioned Examples are carried out with 4094 g of polymer from Example 2, as in Example 3, 4, 5, 6 and 7, respectively.

Example 15

A mixture of 200 g toluene dichloropropane 90/10, 125.21 g of acetoguanamine and 144.2 of 1,2-epoxybutane is heated while stirring in a 10 liters flask from 30° to 50° C., until the reaction between —NH$_2$ and

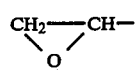

is completed.

4094 g of polymer from Example 2 are added and then is heated at 170° C. until 36 g H$_2$O have been removed azeotropically, the reaction being catalyzed with p-toluene sulphonic acid. The toluene dichloropropane mixture is removed in vacuum at 170° C. The product thus obtained is a brownish low viscous liquid having an acid number of 0 mg KOH/g and being soluble in aromates and aromate-containing liquids.

Example 16

The same procedure and the same quantities in grams of acetoguanamine as stated in Example 15 and 4094 g of polymer of Example 2 are used, while 1,2-epoxybutane is substituted with 228 g of allyl glycidyl ether.

Example 17

A mixture of 200 g toluene-dichloropropane 90/10 187.2 g benzoguanamine and 144.2 g of 1,2-epoxybutane is heated while stirring in a 10 liters flask from 30° to 50° C., until the reaction between —NH$_2$ and

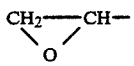

is completed.

8340 g "Hycar CTB 2000×156" (B.F. Goodrich Chemical Company, U.S.A.) are added and then is heated at 170° C., under nitrogen atmosphere using 10 g of hydroquinone monomethylether, until reaction water is formed. When reducing the temperature to 155° C. and adding 10 g of dibutyl tinoxide and 205 g of 1 hexanol more reaction water is formed.

The mixture of toluene-dichloropropane is removed by distillation under vacuum.

The final product is a dark brown transparent highly viscous gelly mass having an acid number of 0 mg KOH/g. The product is soluble in pure aromates and aromate-containing mineral oils.

Example 18

2427 g ricinoleic acid having a COOH eq.w. of 315.17 and an OH eq.w. of 369.1 are reacted while stirring at 220° C. under nitrogen atmosphere in a 20 liters flask together with 10708 g 12-hydroxystearic acid (having a COOH eq.w. of 326.2 and an OH eq.w. of 374) and 250 g toluene. After having removed 639 g water, the temperature is lowered to 140° C. Then 468 g benzoguanamine is added. The temperature is maintained at 140° C. for 30 min and then is introduced 650 g n-butyl glycidyl ether. The temperature is lowered to 80° C. and then are introduced 400 g "Manalox 205" (trade name for an aluminium chelate, isopropylated, from Manchem Ltd, GB). The product is heated at 120° C. for 1 h.

The product thus obtained is a brownish low viscous liquid having an acid number of 0.5 mg KOH/g and being soluble in aromates and aromate-containing liquids.

Example 19

A mixture of 200 g toluene, 4854 g of polymer produced according to Example 1 and 800 g of polypropylene glycol having a eq.w. of 200, (and a mol.w. of 400), are reacted at 200° C. in a 10 liters flask under N$_2$ atmosphere, the reaction being catalyzed with p-toluene sulphonic acid, until 2 moles of waterhave been removed azeotropically, and until the acid number of the reaction product is 1-2 mg KOH/g, corresponding to an OH eq.w. of the product of 2,800. The toluene is removed azeotropically in vacuum at 150° C. The temperature is lowered to 140° C. and then are added 187.2 g benzoguanamine. The product is heated while stirring at 140° C. for 1 hour, and then are added 260 g of n-butyl glycidyl ether. The product is heated at 140° C. for 1 hour, then the temperature is lowered to 80° C. At 80° C. are added 150 g "Manalox 205", and the product is heated at 120° C. for 1 hour.

EXAMPLES ON PREPARING DISPERSIONS AND EASY DISPERSIBLE PIGMENTS

Example 20

6 parts of the product prepared according to Example 3 are dissolved in 8.0 parts of mineral oil (containing 22% aromates and having a boiling range of 260°-290° C.) and 86 parts of P.W. 6 (C.I. No. 77891) (RHD 2, I.C.I.) are admixed with a slowly moving stirrer. After 30 minutes of predispersing, the dispersion is milled once in a 3 roller mill.

The dispersion thus obtained is fluid and contains the white pigment in finely divided and deflocculated state and is excellently suitable for use in e.g. paints, lacquers and printing inks including lithographic printing inks.

Example 21

10 parts of the product prepared according to Example 5 are dissolved in 40 parts of mineral oil mentioned in Example 20 and 50 parts of P.Y. 13 (C.I. No. 21090) (Isol Diaryl Yellow GRF 118, K.V.K.) are admixed with a slowly moving stirrer. After 30 minutes of predispersing the dispersion is milled once in a 3 roller mill.

The dispersion thus obtained is a liquid dispersion in which the pigment is finely divided. The dispersion is suitable for the same purpose as the dispersion according to Example 20.

Example 22

8 parts of the product prepared according to Example 15 are dissolved in 15 parts of mineral oil (containing more than 15% of aromates and having a boiling range of 240°-270° C.), and 77 parts of P.Y. 34 (C.I. No. 77603) are admixed with a slowly moving stirrer.

After 30 minutes of predispersing, the dispersion is milled once on a 3 roller mill.

The dispersion thus obtained is fluid and contains yellow pigment in finely divided and deflocculated state and is suitable for the same purposes as described in Example 20.

Example 23

8 parts of the product prepared according to Example 17 are dissolved in 15 parts of mineral oil described in Example 21 and 77 parts of P.Y. 37 (C.I. No. 77199) are admixed with a slowly moving stirrer.

After predispersing and grinding as in Example 21 the product is suitable for the same purposes as described in Example 20.

Example 24

A compound used as dispersant can be prepared by reacting one of the dispersants obtained according to the Examples 3 to 19 with a salt of Cu-phthalocyanine blue obtained by reacting a Cu-phthalocyanine blue with an amine having the following formula (RNH (CH$_2$)$_3$ NH$_2$), wherein R is a tallow alkyl group.

10 parts of the product prepared according to Example 3 are admixed with 5 parts of monosulphonated Cu-phthalocyanine blue and 2 parts of tallow alkylpropylene diamine (RNH (CH$_2$)$_3$NH$_2$), after 30 minutes mixing on a high speed mixer, and are milled on a 3 roller mill, until the particles of the dispersion have been reduced to 5 μm.

Example 25

15 parts of the product prepared according to Example 24 are dissolved in 27 parts of mineral oil having a boiling range of 240°-270° C. and 58 parts of P.B. 15.3 /e.g. Chromofine Blue 4927, Dainichiseika) are admixed on a slowly moving stirrer. After 30 minutes of predispersing, the dispersion is milled once on a 3 roller mill. The dispersion thus obtained is fluid and contains blue pigment particles in finely divided and deflocculated state and is excellently suitable for use in e.g.

paints, lacquers and printing inks, including lithographic printing inks.

Example 26

15 parts of the product prepared according to Example 24 are dissolved in 27 parts of mineral oil, described in Example 25 and 58 parts of P.B. 7 (e.g. Special Schwartz 15, Degussa). Having applied the same procedure of mixing and grinding as in Example 25, the product thus obtained is a liquid dispersion in which the black pigment particles are deflocculated and finely divided.

The dispersion is suitable for the same purposes as the dispersion according to Example 25.

Example 27

10 parts of the product prepared according to Example 10 are dissolved in 30 parts of mineral oil described in Example 18 and 60 parts of P.R. 57.1 (C.I. No. 15850) (e.g. Esol Bona Rubine 4 BK, K.V.K.) are admixed with a slowly moving stirrer (30 r.p.m.).

After 30 minutes of predispersing, the dispersion is milled once in a 3 roller mill.

The dispersion thus obtained is fluid and contains red pigment in finely divided and deflocculated state and is excellently suitable for use in e.g. paints, lacquers and printing inks, including lithographic printing inks.

Example 28

12 parts of the product prepared according to Example 24 are dissolved in 38 parts of D.O.P. and 50 parts of P.B. 15.3 (C.I. No. 74160) (e.g. Irgalite Blue GLVO, Ciba-Geigy) are admixed with a slowly moving stirrer (30 r.p.m.).

After 30 minutes of predispersing, the dispersion is milled once in a 3 roller mill.

The dispersion thus obtained is fluid and contains blue pigment in finely divided and deflocculated state and is excellently suitable for use in e.g. paints, lacquers and flexographic printing inks.

Example 29

10 parts of the product prepared according to Example 10 are dissolved in 40 parts of D.O.P. and 50 parts of P.B. 15.4 (C.I. No. 74160) (e.g. Isol Phthalo Blue BFC 7548, K.V.K.) are admixed with a slowly moving stirrer (30 r.p.m.).

After 30 minutes of predispersing, the dispersion is milled once in a 3 roller mill.

The dispersion thus obtained is fluid and contains blue pigment in finely divided and deflocculated state and is excellently suitable for use in e.g. paints, lacquers and flexographic printing inks.

Example 30

10 parts of the product prepared according to Example 3 are dissolved in 40 parts of D.O.P. and 50 parts of PR 48.2 (C.I. No. 15865) (e.g. Isol. Bona Red 2 BCT, K.V.K. or Seika fast red 1547, Dainichiseika) are admixed with a slowly moving stirrer (30 r.p.m.).

After the same procedure as described in Example 29, the product thus obtained has the same characteristics and uses as described in Example 29.

Example 31

8 parts of the product prepared according to Example 11 are dissolved in 32 parts of mineral oil described in Example 22 and 60 parts of PB 27 (C.I. No. 77520) (e.g. Milori Blue 690, Dainichiseika) are admixed with a slowly moving stirrer (30 r.p.m.).

After the same procedure as described in Example 22, the product thus obtained has the same characteristics and uses as described in Example 22.

Example 32

100 parts of the product prepared according to Example 16 are dissolved in 350 parts of mineral oil described in Example 22 and 550 parts of P.R. 81 (C.I. No. 45160:1) are admixed with a stirrer for 25 minutes at 30 r.p.m. and 15 minutes at 100 r.p.m.

The dispersion is then milled through a Netzsch pearl mill, fed by a peristaltic pump, at 200 kg/h.

The dispersion thus obtained is fluid and contains pink pigment in finely divided and deflocculated state and is excellently suitable for use in e.g. paints, lacquers and printing inks, including lithographic printing inks.

Example 33

100 parts of the product prepared according to Example 10 are dissolved in 350 parts of mineral oil described in Example 20 and 550 parts of P.V. 3 (C.I. No. 42535:2) are admixed with a stirrer for 15 minutes at 30 r.p.m. and 15 minutes at 100 r.p.m. The dispersion is then milled through a Netzsch pearl mill, fed by a peristaltic pump, at 200 kg/h.

The dispersion thus obtained has the same characteristics and uses as described in Example 22.

Example 34

100 parts of the product prepared according to Example 11 are dissolved in 350 parts of mineral oil described in Example 22 (PKWF 240–270, Haltermann) and 550 parts of P.C. 1 (C.I. No. 42040:1) are admixed with a stirrer for 15 minutes at 30 r.p.m. and for 15 minutes at 100 r.p.m.

The dispersion is then milled through a Netzsch pearl mill fed by a peristaltic pump, at 200 kg/h.

The dispersion thus obtained has the same characteristics and uses as described in Example 32.

Example 35

80 parts of the product prepared according to Example 12 are dissolved in 170 parts of mineral oil described in Example 22 and 750 parts of P.B. 6 (C.I. No. 77491) are admixed with a Silverson-Mixer, provided with a disintegrator head, adding the solid particles during 30 minutes.

After stirring for 1 hour 1000 parts of finely divided and deflocculated concentrated liquid paste are obtained. The paste is excellently suitable for use in e.g. paints, lacquers and printing inks.

Example 36

This example is carried out as Example 35, substituting P.B. 6 (C.I. No. 77491) with P.W. 6 (C.I. No. 77891).

Example 37

Into a 10 liters Attritor of Union Process Co. of modified version, provided with a vacuum device applied on the top and a cooling/heating jacket connected with a closed heat/cooling system, are introduced 2700 g of a filtercake containing 30% of PR 48:2 (C.I. No. 15865) non resinated, 140 g of the product prepared according to Example 3 and 8000 g of steel balls (diameter 1.7 cm), after which the attritor is closed and stirred for 6 hours at 400 r.p.m. at 50°–60° C. max. The attritor is stirred for 16 hours at 80° C. under vacuum (10 mm Hg residual pressure) at 50 r.p.m. The product is then cooled to 30° C. under stirring for 1 hour and sieved from the balls. There is obtained a powder consisting of 85% pigment and 15% dispersant described in Example 3, in granules measuring ⅛–¼ mm.

The pigment mixed on a Silverson Mixer (mentioned in Example 35) together with the varnish constituents for manufacturing of lithographic, flexographic, gravure inks, paints and lacquers, no longer need to be grinded on a 3 roller mill or in a bead mill.

Example 38

Using the same equipment the same times and the same temperatures, mentioned in Example 37, 2700 g of filtercake containing 30% of P.B. 15.3 (C.I. No. 74160) and 140 g of the product prepared according to Example 24, are stirred together and sieved from the balls.

There is obtained a powder consisting of 87% pigment and 13% of an amine salt of the product described in Example 24. The pigment mixed on a Silverson Mixer mentioned in Example 35, together with the varnish constituents for manufacturing of paints, lacquers, lithographic, flexographic and gravure inks, no longer needs to be grinded on a 3 roller mill or in a bead mill.

Example 39

Into a 10 liters Attritor, of the type mentioned in Example 37, 850 g P.B. 7 (Special Schwartz 4, Degussa) 100 g isopropyl alcohol, 1750 g water and 8000 g steel balls (diameter 1.7 cm), are introduced.

The attritor is closed and run for 1 hour at 50 r.p.m. after which 140 g of the product manufactured according to Example 24 are added.

Grinding is continued for 6 hours at 400 r.p.m. at 60° C., after which the speed is reduced to 50 r.p.m. and the attritor is set under vacuum (10 mm Hg residual pressure), at a temperature of 80° C., for 16 hours.

The product is then cooled down to 30° C. under stirring during 1 hour and sieved from the balls.

There is obtained a powder (⅛–¼ mm diameter) consisting of 87% pigment and 13% of an amine salt of the product described in Example 24.

The product dispersed as mentioned in Example 38 can be used for the same purposes as mentioned in Example 38.

Example 40

In a 5 liters laboratory kneader mixer (with 2 Z blades and 2.5 Hp. motor) of "W. & P." type, provided with vacuum and heat/cooling system, 1200 g of filtercake containing 30% of P.R. 57.1 (C.I. No. 15850) are introduced. Under stirring at low speed are added 160 g of dispersant produced according to Example 3.

After the water has been flushed out from the pigment and discharged from the mixer, another 1200 g filter cake are added. Then are added 200 g of mineral oil PKWF 240/270, slowly and while stirring at low speed. After more water having been flushed out and discharged from the mixer, another 1200 g filtercake are added. Then are added 200 g of mineral oil PKWF 240/270, slowly and while stirring at low speed. After more water having been flushed out and discharged from the mixer, the mixer is set under vacuum (15 mm Hg residual pressure) at 85° C. until the water content of the product is below 2% in water testing. After positive water test, 160 g of PKWF 240/270 are added slowly under stirring.

The product thus obtained is a fluid paste containing 60% red deflocculated, finely divided pigment particles, 8.9% of the dispersant (according to Example 3) and 31% PKWF 240/270. The product is excellently suitable for use in e.g. lithographic printing inks, gravure printing inks, paints and lacquers.

Example 41

In a 5 liters laboratory kneader mixer (with 2 Z blades and 2.5 Hp. motor) or "W. & P." type, provided with vacuum, and heat/cooling system, 1200 g of filtercake containing 30% of P.R. 48.2 (C.I. No. 15865) are introduced. Under stirring at low speed 160 g of dispersant produced according to Example 10 are added.

After the water has been flushed out from the pigment and discharged from the mixer, another 1200 g filtercake are added. Then are added 200 g of mineral oil PKWF 240/270, slowly and while stirring at low speed. After more water having been flushed out and discharged from the mixer, another 1200 g filtercake are added. Then are added 200 g of mineral oil PKWF 240/270, slowly and while stirring at low speed. After more water having been flushed out and discharged from the mixer, the mixer is set under vacuum (15 mm Hg residual pressure) at 85° C. until the water content of the product is below 2% in water testing. After positive water test, 160 g of PKWF 240/270 are added slowly. The product thus obtained is a fluid paste containing 60% red deflocculated, finely divided pigment particles, 8.9% of the dispersant (according to Example 10) and 31% PKWF 240/270. The product is excellently suitable for use in e.g. lithographic printing inks, gravure printing inks, paints and lacquers.

Example 42

In a 5 liters laboratory kneader mixer described in Example 41, 950 g of filtercake containing 30% of P.B. 15.3 (C.I. No. 74160) are introduced. Under stirring at low speed 160 g of dispersant produced according to Example 3 are added. After the water has been flushed out from the pigment and discharged from the mixer, another 950 g filtercake are added. Then are added 200 g of mineral oil PKWF 240/270, slowly and while stirring at low speed. After more water having been flushed out and discharged from the mixer 950 g of the above mentioned filtercake, 270 g of a filtercake containing 25% of mono sulphonated Cu-phthalocyanine blue, 30 g of RNH. $(CH_2)_3.NH_2$ and 220 g PKWF 240/270 are added. After more water having been flushed out and discharged from the mixer, the mixer is set under vacuum (15 mm Hg residual pressure) at 85° C., until the water content of the product is below 2% in water testing. The product thus obtained is a fluid paste containing 60 parts blue deflocculated, finely divided pigment particles, partly as an ammonium salt or sulphonamide, 10.44 parts of the dispersant according to Example 3, and 27.4 parts of PKWF 240/270 The product is suitable for the same uses as described in Example 41.

Example 43

In a 5 liters laboratory kneader mixer described in Example 41, 926 g of filtercake containing 30% of P.Y. 13 (C.I. No. 21090) are introduced. Under stirring at low speed 160 g of dispersant produced according to Example 10 are added. After the water has been flushed out from the pigment and discharged from the mixer, another 926 g filtercake are added together with 200 g of mineral oil PKWF 240/270, slowly and while stirring, at low speed. After more water having been flushed out and discharged from the mixer, 926 g of the above mentioned filtercake, 369 g of a filtercake containing 25% of sulphonated dichlorobenzidine yellow (having the formula described in GB Pat. No. 1356253), 40 g of RNH (CH$_2$)$_3$ NH$_2$ and 220 g PKWF 240/270 are added. After more water having been flushed out and discharged from the mixer, the mixer is set under vacuum (10 mm Hg residual pressure) at 55° C. until the water content of the product is below 2% in water testing. The product thus obtained is a fluid paste containing 60 parts yellow deflocculated, finely divided pigment particles, partly as an ammonium salt or sulphonamide, 10.35 parts of the dispersant according to Example 10 and 27.2 parts of PKWF 240/270. The product is suitable for the same uses as described in Example 41.

Example 44

In a 5 liters laboratory kneader described in Example 41, 1200 g of filtercake containing 30% of PB 18 (C.I. No. 42770:1) are introduced. Under stirring at low speed are added 160 g of dispersant produced according to Example 10. After the water has been flushed out from the pigment and discharged from the mixer, another 1200 g filtercake are added. Then are added 200 g of mineral oil PKWF 240/270, while stirring at low speed. After more water having been flushed out and discharged from the mixer, another 1200 g filtercake are added. Then are added 200 g of mineral oil PKWF 240/270, while stirring at low speed. After more water having been flushed out and discharged from the mixer, the mixer is set under vacuum (15 mm Hg residual pressure) at 95° C. until the water content of the product is below 2% in water testing. After positive water test, 160 g of PKWF 240/270 are added slowly under stirring. The product thus obtained is a fluid paste containing 60% blue deflocculated, finely divided pigment particles, 8.9% of the dispersant (according to Example 10) and 31% PKWF 240/270. The product is excellently suitable for use in e.g. lithographic printing inks.

Example 45

In a 5 liters laboratory kneader described in Example 41, 1160 g PB 7 (C.I. No. 77266) (e.g. Special Schwartz 15, Degussa), 1800 g water and 200 g n-propanol are introduced while stirring at low speed for 45 min. Then 300 g of the dispersant produced according to Example 24 are added slowly under stirring at low speed. Then 380 g PKWF 240/270 are added until the water/n-propanol mixture is flushed out from the pigment. After the water/n-propanol mixture has been discharged from the mixer, the mixer is set under vacuum (15 mm Hg residual pressure) at 90° C. until the water content of the product is below 2% in water testing. After positive water test, 160 g of PKWF 240/270 are added slowly under stirring. The product thus obtained is a fluid paste containing 58% black pigment particles finely divided in mineral oil/dispersant mixture.

The product is excellently suitable for the same uses described in Example 41.

Example 46

All the examples described from Example 20 to Example 45 are repeated, substituting the respective dispersants with the dispersant made according to Example 19. In all cases the results are similar to those obtained with the dispersants of each example respectively.

I claim:

1. A dispersing agent comprising compunds of the formulas

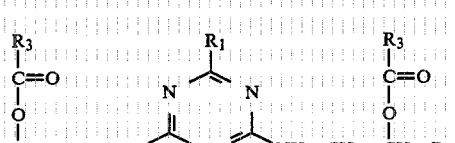

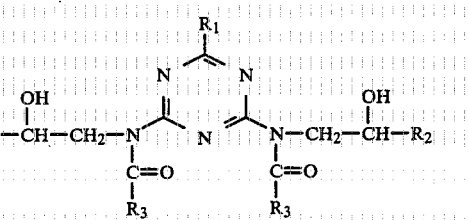

and

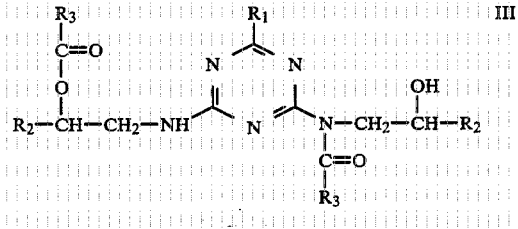

wherein
 R$_1$ is aryl or alkyl having 1–8 carbon atoms,
 R$_2$ in a hydrocarbon radical optionally comprising one or more ether groups and having a molecular weight of less than 200, and
 R$_3$ is a branched polyester chain residue, having a molecular weight of at least 1000, which polyester chain has been obtained by polymerization of a saturated or unsaturated monohydroxy monocarboxylic acid having 8–20 carbon atoms between the oxygen atoms,
which compounds are obtainable by reacting
 a diamino triazone of the formula

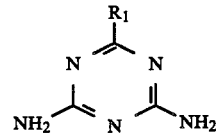

an oxiran containing compound of the formula

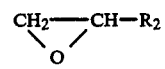

and
 a polymer chain of the formula

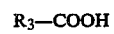

in which formulas R$_1$, R$_2$ and R$_3$ are as defined above, in stoichiometrically equivalent amounts.

2. A dispersing agent according to claim 1, wherein $R_2$ is selected from alkyl having 1–4 carbon atoms and $R-O-CH_2-$, wherein R is a hydrocarbon radical having 1–8 carbon atoms.

3. A dispersing agent according to claim 1, which has been obtained by reacting an acetoguanamine or a benzoguanamine as the diamino triazine of the formula VI, an allyl glycidyl ether, n-butyl glycidyl ether, 2-ethyl hexyl glycidyl ether, phenyl glycidyl ether, epoxy propane or epoxy butane as the oxiran containing compound of the formula VII, and a polyester derived from 12-hydroxystearic acid and/or ricinoleic acid or a carboxy terminated polybutadiene as the polymer chain of the formula VIII.

4. Process for preparing a dispersing agent according to claim 1, wherein the diamino triazine of the formula VI is first reached with the oxiran containing compound of the formula VII to an intermediate product comprising compounds of the formulas

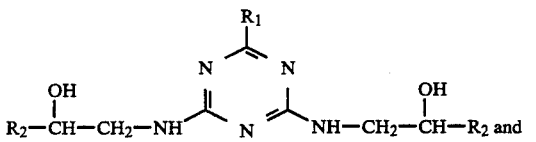

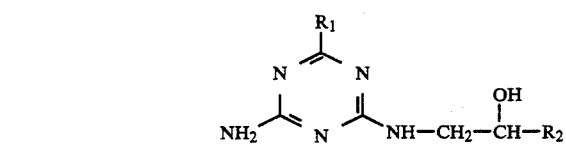

wherein $R_1$ and $R_2$ are as defined in claim 1, and the intermediate product is then reacted with the polymer chain of the formula VIII, and the water being formed during the reaction is removed.

5. Process according to claim 4, wherein the reaction is performed by heating the components under inert atmosphere.

6. Process for preparing a dispersing agent according to claim 1, wherein the diamino triazine of the formula VI is first reacted with the polymer chain of the formula VIII to an intermediate product being a salt, and the intermediate product is then reacted with the oxiran containing compound of the formula VII, and the water being formed during the reaction is removed.

7. Process according to claim 6, wherein the reaction is performed by heating the components under inert atmosphere.

8. A dispersing agent comprising compounds of the formulas

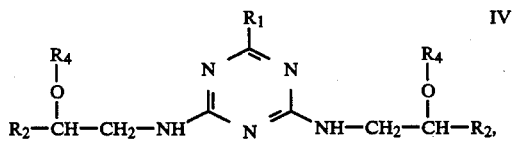

and

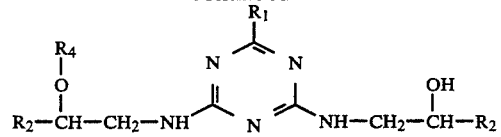

wherein
$R_1$ is aryl or alkyl having 1–8 carbon atoms,
$R_2$ is a hydrocarbon radical optionally comprising one or more ether groups and having a molecular weight of less than 200, and
$R_4$ is a polymer chain residue, having a molecular weight of at least 1000, which polymer chain has been obtained by reacting a diol or a polyalkylene glycol with a polyester,
which compounds are obtainable by reacting
a diamino triazine of the formula

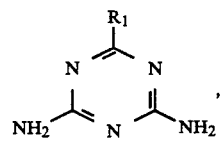

an oxiran containing compound of the formula

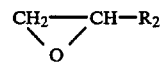

and
a polymer chain of the formula $$R_4-CH \qquad \text{IX}$$

in which formulas $R_1$, $R_2$ and $R_4$ are as defined above, in stoichiometrically equivalent amounts.

9. A dispersing agent according to claim 8, wherein $R_2$ is selected from alkyl having 1–4 carbon atoms and $R-O-CH_2-$, wherein R is a hydrocarbon radical having 1–8 carbon atoms.

10. Process for preparing a dispersing agent according to claim 8, wherein the diamino triazine of the formula VI is first reacted with the oxiran containing compound of the formula VII to an intermediate product comprising compounds of the formulas

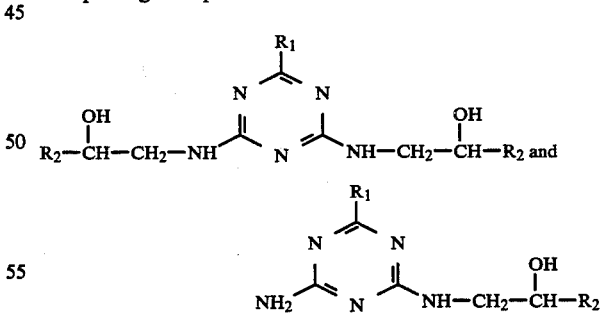

wherein $R_1$ and $R_2$ are as defined in claim 8, and the intermediate product is then reacted with the polymer chain of the formula IX, and the water being formed during the reaction is removed.

11. Process for preparing a dispersing agent according to claim 8, wherein the diamino triazine of the formula VI is first reacted with the polymer chain of the formula IX to an intermediate product being a salt, and the intermediate product is then reacted with the oxiran containing compound of the formula VII, and the water being formed during the reaction is removed.

* * * * *